INVENTOR.
JOHN M. CRAWFORD
BY
ATTORNEYS

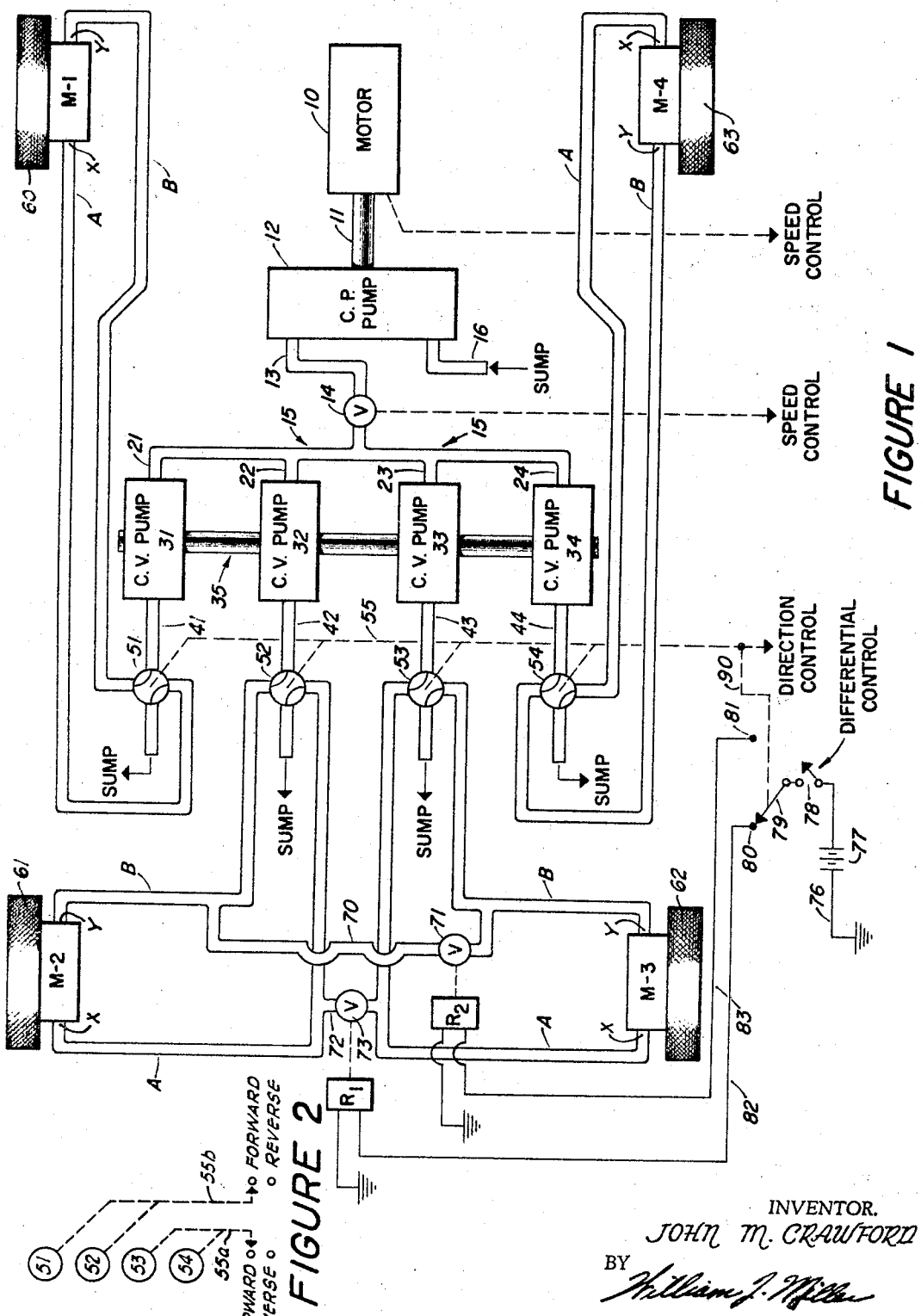

United States Patent Office 3,448,577
Patented June 10, 1969

3,448,577
HYDRAULIC DRIVE SYSTEM
John M. Crawford, 121 Whitworth,
Ponca City, Okla. 74601
Continuation-in-part of application Ser. No. 540,766,
Apr. 6, 1966. This application May 27, 1968, Ser.
No. 748,139
Int. Cl. B60k *17/10, 17/34;* F16h *39/02*
U.S. Cl. 60—53                                    15 Claims

ABSTRACT OF THE DISCLOSURE

A system for driving the wheels of a vehicle wherein each wheel is connected to a separate hydraulic motor. Each hydraulic motor is hydraulically connected to a constant volume pump and the rotors of the constant volume pumps are connected only to a common shaft. A primary pump supplies fluid to the constant volume pumps in parallel, such that any one of the wheels may be driven by the equivalent of the output pressure of the primary pump times the number of wheels. Controls are provided to vary the speed of at least some of the hydraulic motors and to selectively reverse the direction of rotation of the wheels.

CROSS REFERENCES TO RELATED APPLICATIONS

This is a continuation-in-part of applicant's co-pending application of the same title, Ser. No. 540,766, filed Apr. 6, 1966, now abandoned.

BACKGROUND OF THE INVENTION

Field of the invention

This invention relates to improvements in hydraulic drive systems, and more particularly, but not by way of limitation, to an improved drive system for a vehicle.

Description of the prior art

The prior art contains many teachings of the use of hydraulic motors associated with the driving wheels of vehicles, but up to this time, the use of such systems has been limited to special applications where versatility is minimized. For example, no previous hydraulic system is known where the power normally supplied to a wheel which is slipping is automatically transferred to a wheel which is not slipping, and yet the system being capable of efficiently providing differential action between the wheels on the opposite sides of a vehicle when the vehicle is being turned.

SUMMARY OF THE INVENTION

The present invention contemplates a hydraulic drive system particularly suited for a vehicle having either a two or four wheel drive. A hydraulic motor is associated with each driving wheel, and each motor is supplied hydraulic fluid by an individual, or separate, constant volume pump. The rotors of all of the constant volume pumps are connected to a common shaft, whereby power is transferred from one wheel to another in the event the one wheel starts slipping. The drive system further includes means for bypassing hydraulic fluid around the motors on either side of the vehicle to provide a differential in the speed of the wheels on the opposite sides of the vehicle when the vehicle is being turned.

An object of the invention is to increase the versatility of hydraulic drive systems.

Another object of the invention is to efficiently provide a differential in the speed of wheels on the opposite sides of a vehicle employing a hydraulic drive system when the vehicle is being turned, and yet provide a transfer of power between the various wheels when one or more of the wheels starts slipping.

A further object of the invention is to provide an economical hydraulic drive system adaptable to many uses.

Other objects and advantages of the invention will be evident from the following detailed description, when read in conjunction with the accompanying drawings which illustrate the invention.

BRIEF DESCRIPTION OF THE DRAWINGS

FIGURE 1 is a schematic illustration of a hydraulic drive system incorporating the invention.

FIGURE 2 is a schematic diagram of a modified valving arrangement for the system shown in FIGURE 1.

DESCRIPTION OF THE PREFERRED EMBODIMENTS

Figure 4:
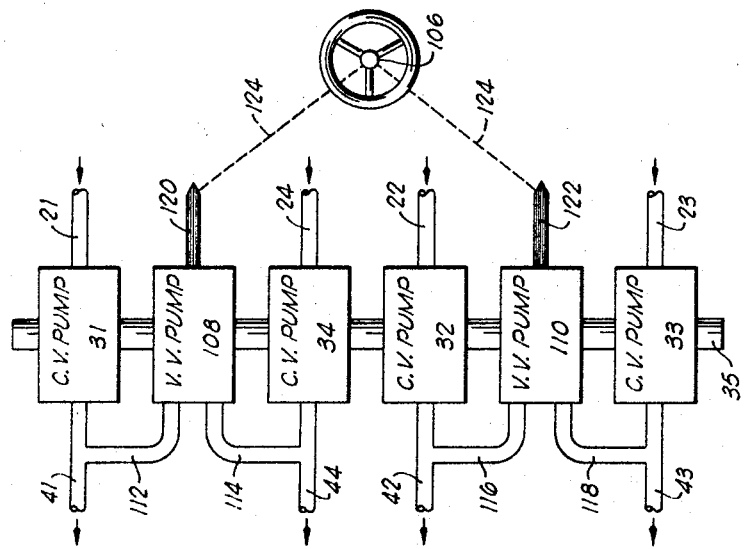
FIGURE 4 is another schematic illustration of a portion of another modified hydraulic drive system.

Referring to FIGURE 1, a power plant for the system comprises a truck engine 10 mechanically connected through a clutch or fluid drive and a shaft 11 to the rotor of a primary pump 12 which is preferably a constant pressure hydraulic pump. A pump suitable for this purpose is fully described in the reference work entitled "Design Fluid Power Book," chapter 7, published Dec. 21, 1963, by the Penton Publishing Company, and will not be further described here. The main requirement for the pump is that it delivers certain and sufficient hydraulic horsepower for the size and use intended.

The outlet of constant pressure pump 12 is connected through a pipe 13 and valve 14, to a manifold distribution system generally referred to by arrow 15. The only design requirements for manifold 15 is that the pressure under uniform flow be held relatively constant at the inlets 21, 22, 23, and 24, of rotary, constant volume (positive-displacement) pumps 31, 32, 33, and 34, respectively. Each of the pumps 31 through 34 is preferably a rotary vane, positive-displacement pump which will function as a pump when its rotor is turned and which will function as a motor when a pressure differential is applied across the inlet and outlet thereof. Design requirements for a constant volume pump are fully described in chapter 6 of the "Fluid Power Book" above cited.

Each of the constant volume pumps 31 through 34 has its rotor connected to a common shaft 35. The outlets 41, 42, 43, and 44 of pumps 31 through 34, respectively, are each connected to a 4-way valve 51, 52, 53, and 54, respectively. All of the rotors of the 4-way valves 51 through 54 are connected by a mechanical linkage 55 so that all rotors will operate in unison.

In the embodiment disclosed in FIGURE 1, a series of four hydraulic motors M-1, M-2, M-3 and M-4 are provided for the four wheels 60, 61, 62 and 63 of the vehicle to be driven by the system, with a separate motor for each wheel. Each of the hydraulic driving motors M-1, M-2, M-3 and M-4, has both its high pressure or forward port X and its low pressure or reverse port Y coupled to its corresponding 4-way valve 51 through 54 through a pair of hydraulic pipes A and B. Motors M-1 through M-4 are preferably identical units to pumps 31 through 34 which will simplify maintenance considerably.

A sump, not shown, is connected to the remaining outlet of valves 51 through 54 and to the inlet 16 of hydraulic pump 12.

A rear wheel differential is preferably incorporated in the system and essentially comprises a bypass pipe 70 and and valve 71 connected between the B pipes of M–2 and M–3; and a bypass pipe 72 and valve 73 connected between the pipes A of M–2 and M–3. Remote operation devices $R_1$ and $R_2$, such as solenoids, are connected mechanically to valves 73 and 71, respectively, and are operated by power applied between a ground lead 76, a battery 77, an enabling switch 78, and a selector switch 79. Poles 80 and 81 of switch 79 pass the voltage to either $R_1$ or $R_2$, depending upon the position of switch 79. This remote system may also be hydraulically powered as well as electrically powered. A front wheel differential can also be installed which is identical to the rear wheel system above described. Such a system would operate in the same manner.

OPERATION OF FIGURE 1 SYSTEM

The hydraulic propulsion system operates in the following manner. Power is generated by the prime mover, such as a diesel or gasoline engine 10, which applies its output power through shaft 11 to the primary pressure pump 12. The hydraulic fluid is removed from the sump not shown and supplied to the manifold 15 under pressure through pipe 13 and valve 14. The primary requirement of manifold 15 is that substantially equal pressure must be developed at the inlets 21 through 24 of the pumps 31 through 34 respectively. When all four wheels of the vehicle are pulling by the same amount, equal torque will be required by the drive motors M–1 through M–4, causing a uniform flow through the pumps 31 through 34 to the motors M–1 through M–4. Since all four pumps are connected to common shaft 35, all four pumps must rotate in unison, assuring that each pump will deliver an equal volume of fluid. As fluid flows through all pumps, the shaft 35 will create little or no increase or decrease in the torque applied to any of the rotors of pumps 31 through 34; therefore, under these conditions the system would operate equally well without shaft 35. If a wheel associated with motor M–1 (for example) should slip, however, the torque required of M–1 would drastically reduce, thereby causing a drop in pressure at the high pressure side of the motor M–1. The drop in pressure will result in a pressure drop across the corresponding pump 31, converting it to a motor which will apply torque to shaft 35. The increase in the torque of shaft 35 will be transferred to the pumps 32 through 34, causing them to pass the same amount of fluid as pump 31 even though the resistance to flow is greater because of greater tractive load on M–2, M–3, and M–4. The increase in fluid flow will increase the horsepower to each of the wheels connected with motors M–2, M–3 and M–4. Here it should be noted that the transfer in power was not done with any complex valving arrangement, but rather was done automatically as needed and as rapidly as the power requirements between the wheels shift. Thus, one very important aspect of the invention is the operation of pumps 31 through 34 which will function either as pumps or motors. When acting as a pump, the corresponding drive motor will be powered in the usual fashion; but when operating as a motor (because of less of torque requirement at the rotor shaft of its corresponding drive motor) power will be delivered by the rotor to the common shaft connecting all of the pumps, thereby increasing the available horsepower from the remaining pumps to their corresponding drive motors.

If a situation arises where a wheel is stuck but will not slip (against a rock, etc.), the pressure at the inlet to motor M–1, for example, will increase tending to decrease the flow through pump 31. This decrease would tend to slow down the pump 31 if it were operating independently of the shaft 35; however, the remaining pumps 32 through 34 would turn the rotor of 31, causing an increase in pressure delivered by the pump 31 and a much increased pressure (and horsepower) to M–1. The pressure will increase until enough horsepower is applied to the stuck wheel to free same, whereupon the flow rates of each of the pumps 31 through 34 will be restored. The amount of pressure applied by the system to M–1 may increase to a maximum of approximately four times the pressure delivered by the constant pressure pump if the other three wheels are spinning freely.

If differential action between the rear wheels, or front wheels, is required the fluid bypass system will operate in the following manner. Under normal conditions, pressures in pipes A to the ports of motors M–2 and M–3, for example, assuming they are the high pressure lines, will be equal. When the vehicle begins to round a corner, one wheel must rotate faster than the other wheel. The increased rotation necessitates an increased flow in one motor, M–2 for example, and a decrease in flow through M–3. The change in flow is accomplished by activating switch 78 which will apply power from battery 77 to switch 79 which is switched by the direction control to contact 80. The operation of switch 79 will be more fully explained in a following portion of this specification. From contact 80, power will flow through wire 82 to remote ocntrol valve actuator $R_1$; whereupon valve 73 will be opened. Fluid will then pass from pipe A of M–3 to pipe A of M–2, resulting in the desired flow. The fluid will flow in the aforementioned direction since M–3, being on the inside of the turn, will be retarded in its forward movement, resulting in an increased pressure at the high pressure side (pipe A) of M–3. Conversely, a drop in pressure will result in pipe A of M–2, since its wheel is moving faster than normal. When the vehicle is traveling in a reverse direction, switch 79 will make with contact 81, operating remote control valve actuator $R_2$ from power through wire 83. Actuator $R_2$ will open valve 71 and provide differential action in the same manner above described. The control system for operating switch 78 may be synchronized with the steering apparatus of the truck in such a way that differential action is automatically provided when the vehicle is turned by the steering apparatus.

Reversal means for the vehicle is provided by 4-way valves 51 through 54. These valves operate in the normal manner by reversing the direction of flow through the motors; that is change the high pressure pipes from A to B or from B to A. A remote control arm 55 is generally shown. Arm 55 also contains mechanical linkage 90 which is connected to switch arm 79. The mechanical linkage 90 will selectively operate arm 79 so that the proper valve 71 or 73 will be open. The selection of valves 71 or 73, of course, depends upon the direction of the vehicle; that is, whether pipes A are high pressure or pipes B are high pressure.

Speed control can be acquired to some extent by varying the speed of the primary motor 10, but to the greatest extent by varying the pressure to the manifold 15. The variation in pressure is accomplished by either mechanically varying the pressure setting of the pump itself, or by changing the setting of valve 14. The preferred method, of course, is to vary the setting of valve 14.

It is possible to cause the wheels on one side of the vehicle to go forward while the wheels on the other side are in reverse. The above can easily be accomplished by opening switch 78 (see FIGURE 1) to disconnect the differential control and (see FIGURE 2) by making the direction control linkage 55 separate between valves 52 and 53, so that valves 51 and 52 could be valved to cause motors M–1 and M–2 to rotate forward, and valves 53 and 54 valved to cause motors M–3 and M–4 to rotate reverse of M–1 and M–2. Thus, as shown in FIGURE 2, linkage 55b could be set to the forward position, and 55a to the reverse position and the vehicle make a very sharp right turn within the length of the vehicle.

EMBODIMENT OF FIGURE 3

Figure 3:
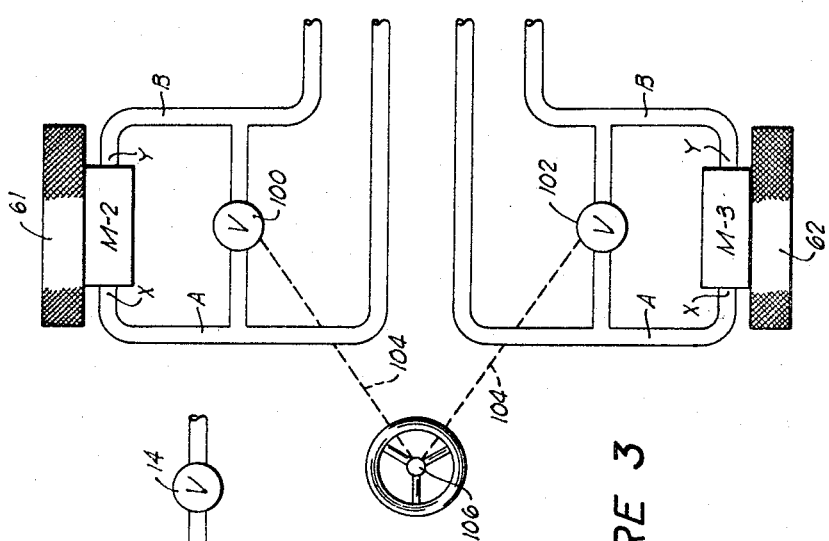
FIGURE 3 is a schematic illustration of a portion of a hydraulic drive system showing a modification of the system of FIGURE 1.

The system partially illustrated in FIGURE 3 is of the same construction as the system illustrated in FIG- URE 1, except for the means employed for bypassing fluid around the hydraulic motors associated with the wheels of the vehicle to obtain the differential speeds required when the vehicle is turned.

In the embodiment shown in FIGURE 3, a bypass valve 100 is connected between the pipes A and B of the motor M-2, and another bypass valve 102 is connected between the pipes A and B of the motor M-3. The valves 100 and 102 are preferably throttling valves to vary the volume of hydraulic fluid which may be passed therethrough. The valves 100 and 102 are connected by suitable linkage 104 to the steering system of the vehicle as schematically represented by the steering wheel 106.

In connection with a system as illustrated in FIGURE 3, it should be understood that valves of the same type as the valves 100 and 102 would be connected between the pipes A and B of all hydraulic motors employed in driving the wheels of the vehicle. In other words, if the vehicle had a four wheel drive, the bypass valves 100 and 102 would also be employed with the hydraulic motors driving the front wheels of the vehicle.

In operation of a system of the type illustrated in FIGURE 3, let it first be assumed that the vehicle is being turned in such a direction that the wheel 61 is on the inside of the turning radius and therefore must turn at a lesser speed than the wheel 62. In this event, the steering system 106, through the linkage 104, opens the valve 100 the necessary amount to bypass hydraulic fluid around the motor M-2 from the high pressure pipe A to the low pressure pipe B for decreasing the speed of rotation of the wheel 61. It will be readily understood that the sharper the turn, the greater the valve 100 should be opened to provide a greater bypass of fluid around the motor M-2.

In the event the vehicle is turned in the opposite direction, the valve 102 will be opened by the steering system 106 to bypass fluid around the motor M-3 and decrease the speed of rotation of the wheel 62.

EMBODIMENT OF FIGURE 4

The system partially illustrated in FIGURE 4 is the same as the system illustrated in FIGURE 1, except for the means employed for bypassing of fluid around selected wheel motors to provide a differential in speed between the wheels on the opposite sides of a vehicle.

In the FIGURE 4 system, the rotors of a pair of variable volume pumps 108 and 110 are mounted on or connected to the shaft 35 along with the rotors of the constant volume pumps 31 through 34. The fluid connections of the pump 108 are connected by a conduit 112 to the conduit 41 leading from the constant volume pump 31, and by a conduit 114 to the conduit 44 leading from the constant volume pump 34. Similarly, the fluid connections of the pump 110 are connected by a conduit 116 to the conduit 42 leading from the constant volume pump 32, and by a conduit 118 to the conduit 43 leading from the constant volume pump 33. The control lever 120 of the pump 108, and the control lever 122 of the pump 110 are both connected by a suitable linkage 124 with the steering system of the vehicle as schematically represented by the steering wheel 106.

Suitable variable volume pumps which may be employed are illustrated on page 33 of the book entitled "Machine Design," The Fluid Power Book Issue, published Dec. 12, 1963 by the Penton Publishing Co. of Cleveland, Ohio, and in a publication entitled "The Garwood Ultra-Static Systems," further identified as form H-105 4-67 published by Gar Wood Industries Inc. of Hillsdale, Mich.

In operation of the system of the type shown in FIGURE 4, let it be assumed that the vehicle is being turned in a direction to place the wheels 60 and 61 (FIGURE 1) on the inside of the turning radius such that these wheels will need to be turned at a lesser speed than the wheels 62 and 63. In that event, the steering system 106, through the linkages 124, will actuate the control levers 120 and 122 of the variable volume pumps 108 and 110 in such a direction that a portion of the fluid supplied by the constant volume pump 31 will be transferred by the pump 108 to the conduit 44 leading from the constant volume pump 34, such that more fluid will be supplied to the motor M-4 than is supplied to the motor M-1. Similarly, the pump 110 takes hydraulic fluid from the constant volume pump 32 and supplies such fluid to the output of the constant volume pump 33 to provide more fluid to the motor M-3 than is supplied to the motor M-2.

When the steering system 106 is again turned in such a direction that the vehicle is traveling in a straight line, the control levers 120 and 122 of the pumps 108 and 110 are repositioned to neutral positions and the pumps 108 and 110 will then simply be idling and providing no transfer of fluid between the outputs of the various constant volume pumps. Conversely, if the steering system 106 is turned in a direction to turn the vehicle in the other direction, the action of the pumps 108 and 110 will be the reverse of that previously described to reduce the amount of hydraulic fluid supplied to the motors M-3 and M-4 and increase the amount of fluid supplied to the motors M-1 and M-2.

EMBODIMENTS OF FIGURE 5

Figure 5:
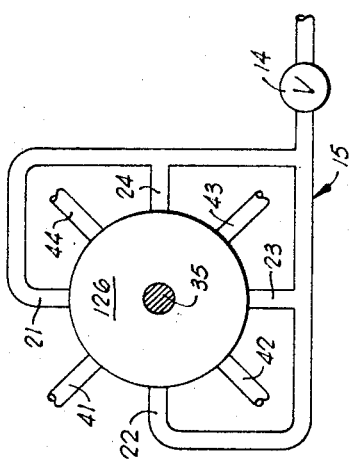
FIGURE 5 is a schematic illustration of a modified constant volume pump arrangement.

The system shown in FIGURE 5 is the same as the system shown in either FIGURES 1, 3 or 4, except for the constant volume pump arrangement. In some circumstances, it is desirable to minimize the number of separate pumps employed in a drive system. Under these circumstances, the four separate constant volume pumps 31 through 34 previously disclosed as being mounted on a common shaft 35 may be replaced by a single constant volume pump 126 as shown in FIGURE 5. The pump 126 is what is commonly known as a four section vane type motor or pump and a suitable pump of this type can be obtained from Vickers, Incorporated of Detroit, Mich.

In a four section vane type motor or pump, the pump has four separate pumping chambers. Thus, the manifold 15 is connected by the separate conduits 21 through 24 to the individual inlets of the pump 126, and the individual outlets for the pumping chambers are connected by the conduits 41 through 44 with the respective hydraulic motors in the manner illustrated in FIGURE 1.

One of the many uses of the drive system of this invention is in vehicles used for transporting hydraulically actuated vibrators employed in seismic prospecting. In such an environment, the output of the pump 12 may also be connected to the hydraulic drive motor of the vibrator, as well as the vehicle drive system, such that the same power plant may be used for driving the vehicle and driving the vibrator, resulting in many economies in equipment cost and operation.

From the foregoing, it will be apparent that the present invention provides a highly versatile hydraulic drive system particularly suited for vehicles. The system provides a transfer of power to the wheel or wheels having traction, yet fluid is bypassed around the driving motors on either side of the vehicle when the vehicle is being turned to provide the necessary differential speed between the wheels of the vehicle.

Changes may be made in the combination and arrangement of parts or elements as heretofore set forth in the specification and shown in the drawings, without departing from the spirit and scope of the invention as defined in the following claims.

What is claimed is:
1. A system for driving a plurality of wheels of a vehicle, comprising:
 a prime mover;
 a primary pump drivingly connected to the prime mover and having an inlet and an outlet;

a supply of hdyraulic fluid connected to the inlet of the primary pump;

a plurality of rotary, constant volume pumps capable of functioning as motors as well as pumps, each of said constant volume pump having an inlet and an outlet with the inlet thereof connected to the outlet of the primary pump;

a rotary, fluid motor drivingly connected to each of the wheels of the vehicle, one of said motors being hydraulically connected to the outlet of one of said constant volume pumps and the other motor hydraulically connected to the outlet of the other of said constant volume pumps, each of said motors having a forward and a reverse port;

a common shaft connected to the rotors of said constant volume pumps for transferring power between said constant volume pumps upon variations in the resistance to rotation of the wheels; and means for bypassing hydraulic fluid around any of said motors when the respective motor requires less fluid than the other motors for a differential in speed between the wheels of the vehicle.

2. A system for driving two wheels of a vehicle, comprising:

a prime mover;

a primary pump drivingly connected to the prime mover and having an inlet and an outlet;

a supply of hydraulic fluid connected to the inlet of the primary pump;

a pair of rotary, constant volume pumps capable of functioning as motors as well as pumps, each of said constant volume pumps having an inlet and an outlet with the inlet thereof connected to the outlet of the primary pump;

a rotary, fluid motor drivingly connected to each of the two wheels of the vehicle, one of said motors being hydraulically connected to the outlet of one of said constant volume pumps and the other motor hydraulically connected to the outlet of the other of said constant volume pumps, each of said motors having a forward and a reverse port;

a common shaft connected to the rotors of both of said constant volume pumps for transferring power between said constant volume pumps upon variations in the resistance to rotation of the wheels;

said hydraulic connection of each constant volume pump to its respective motor comprising:

a 4-way valve;

a conduit connecting one port of the 4-way valve to the outlet of the constant volume pump;

a conduit connecting a second port of the 4-way valve to the fluid supply;

a conduit connecting a third port of the 4-way valve to the forward port of the motor;

a conduit connecting a fourth port of the 4-way valve to the reverse port of the motor, whereby the motors may be driven in either direction, and bypass means connecting one of the conduits supplying fluid to each of the motors to another of said conduits to decrease the fluid supplied to either of the motors when its respective wheel is required to turn at a lesser speed than the other wheel.

3. A system as defined in claim 1 characterized further to include:

a steering system for the vehicle; and linkage means connecting said first-mentioned means to the steering system.

4. A system as defined in claim 1 characterized further to include:

a steering system for the vehicle; and linkage means connecting said bypass means to the steering system.

5. A system as defined in claim 1 wherein said means includes a valve in the hydraulic circuit associated with each motor.

6. A system as defined in claim 1 wherein said means includes a variable volume pump interposed between the outlets of the constant volume pumps.

7. A system as defined in claim 6 wherein said vehicle includes a steering system, said variable volume pump includes a control arm, and characterized further to include:

linkage means connecting the control arm of the variable volume pump to the steering system of the vehicle.

8. A system as defined in claim 2 wherein said bypass means comprises:

a first valve connected between the conduits extending from the forward ports of the motors;

a second valve connected between the conduits extending from the reverse ports of the motors; and means for selectively opening and closing said first and second valves.

9. A system as defined in claim 2 wherein said bypass means comprises:

a first valve connected between the conduits extending from the forward and reverse ports of one of the motors;

a second valve connected between the conduits extending from the forward and reverse ports of the other motor; and control means connected to both of said valves.

10. A system as defined in claim 8 wherein said first and second valves are throttling valves to vary the bypass of fluid therethrough.

11. A system as defined in claim 2 wherein said bypass means comprises:

a variable volume pump connected between the conduits extending from the outlets of the constant volume pumps.

12. A drive system for four wheels of a vehicle, comprising:

a prime mover;

a primary pump drivingly connected to the prime mover and having an inlet and an outlet;

a supply of hydraulic fluid connected to the inlet of the primary pump;

four rotary, constant volume pumps capable of functioning as motors as well as pumps, each of said constant volume pumps having an inlet and an outlet with the inlet thereof connected to the outlet of the primary pump;

a rotary, fluid motor drivingly connected to each of the four wheels of the vehicle, each of said motors being hydraulically connected to the outlet of a separate one of said constant volume pumps, and each of said motors having a forward and a reverse port;

a common shaft connected to the rotors of said constant volume pumps for transferring power between said constant volume pumps upon variations in the resistance to rotation of the wheels;

said hydraulic connection between the outlet of each constant volume pump and its corresponding motor comprising:

a four-way valve;

a conduit connecting one port of the 4-way valve to the outlet of the pump;

a conduit connecting a second port of the 4-way valve to the fluid supply;

a conduit connecting a third port of the 4-way valve to the forward port of the motor;

a conduit connecting a fourth port of the 4-way valve to the reverse port of the motor, whereby the motors may be driven in either direction;

a first linkage connecting the valve members of the 4-way valves associated with the wheels on one side of the vehicle for simultaneous and like operation; and a second linkage connecting the valve members of the 4-way valves associated with the wheels on the other side of the vehicle for simultaneous and like operation, whereby the wheels on one side of the vehicle may be driven in one direction while the wheels on the other side of the vehicle are driven in the opposite direction.

13. A system for driving two wheels of a vehicle comprising:
a prime mover;
a primary pump drivingly connected to the prime mover and having an inlet and an outlet;
a supply of hydraulic fluid connected to the inlet of the primary pump;
a pair of rotary, constant volume pumps capable of functioning as motors as well as pumps, each of said constant volume pumps having an inlet and an outlet with the inlet thereof connected to the outlet of the primary pump;
a rotary, fluid motor drivingly connected to each of the two wheels of the vehicle, one of said motors being hydraulically connected to the outlet of one of said constant volume pumps and the other motor hydraulically connected to the outlet of the other of said constant volume pumps, each of said motors having a forward and a reverse port;
a common shaft connected to the rotors of both of said constant volume pumps for transferring power between said constant volume pumps upon variations in the resistance to rotation of the wheels;
said hydraulic connection of each constant volume pump to its respective motor, comprising:
a four-way valve;
a conduit connecting one port of the 4-way valve to the outlet of the constant volume pump;
a conduit connecting a second port of the 4-way valve to the fluid supply;
a conduit connecting a third port of the 4-way valve to the forward port of the motor;
a conduit connecting a fourth port of the 4-way valve to the reverse port of the motor, whereby the motors may be driven in either direction;
a bypass conduit interconnecting the conduits extending from the forward ports of the motors;
a control valve in said bypass conduit; and
means for opening said control valve when the vehicle is moving forward in other than a straight line, whereby the wheels turn at different speeds and the motors are supplied with different amounts of fluid.

14. The system as defined in claim 12 characterized further to include:
a second bypass conduit interconnecting the conduits extending from the reverse ports of the motors;
a second control valve in said second bypass; and
means for opening said second control valve when the vehicle is moving in a reverse direction and in other than a straight line.

15. The system of claim 11 wherein said four constant volume pumps are combined in one housing.

References Cited
UNITED STATES PATENTS

| | | |
|---|---|---|
| 2,291,578 | 7/1942 | Johnson. |
| 2,301,098 | 11/1942 | Twynan _____ 60—53 XR |
| 2,331,337 | 10/1943 | Meyer _____ 91—413 XR |
| 2,409,335 | 10/1946 | von Stackelberg __ 60—523 XR |
| 2,431,719 | 12/1947 | Wilkin _____ 60—53 |

EDGAR W. GEOGHEGAN, *Primary Examiner.*

U.S. Cl. X.R.

60—97; 91—413; 180—44